Aug. 13, 1968     H. A. CRESS ET AL     3,396,893
FRICTION WELDER
Filed Nov. 1, 1966     4 Sheets-Sheet 1
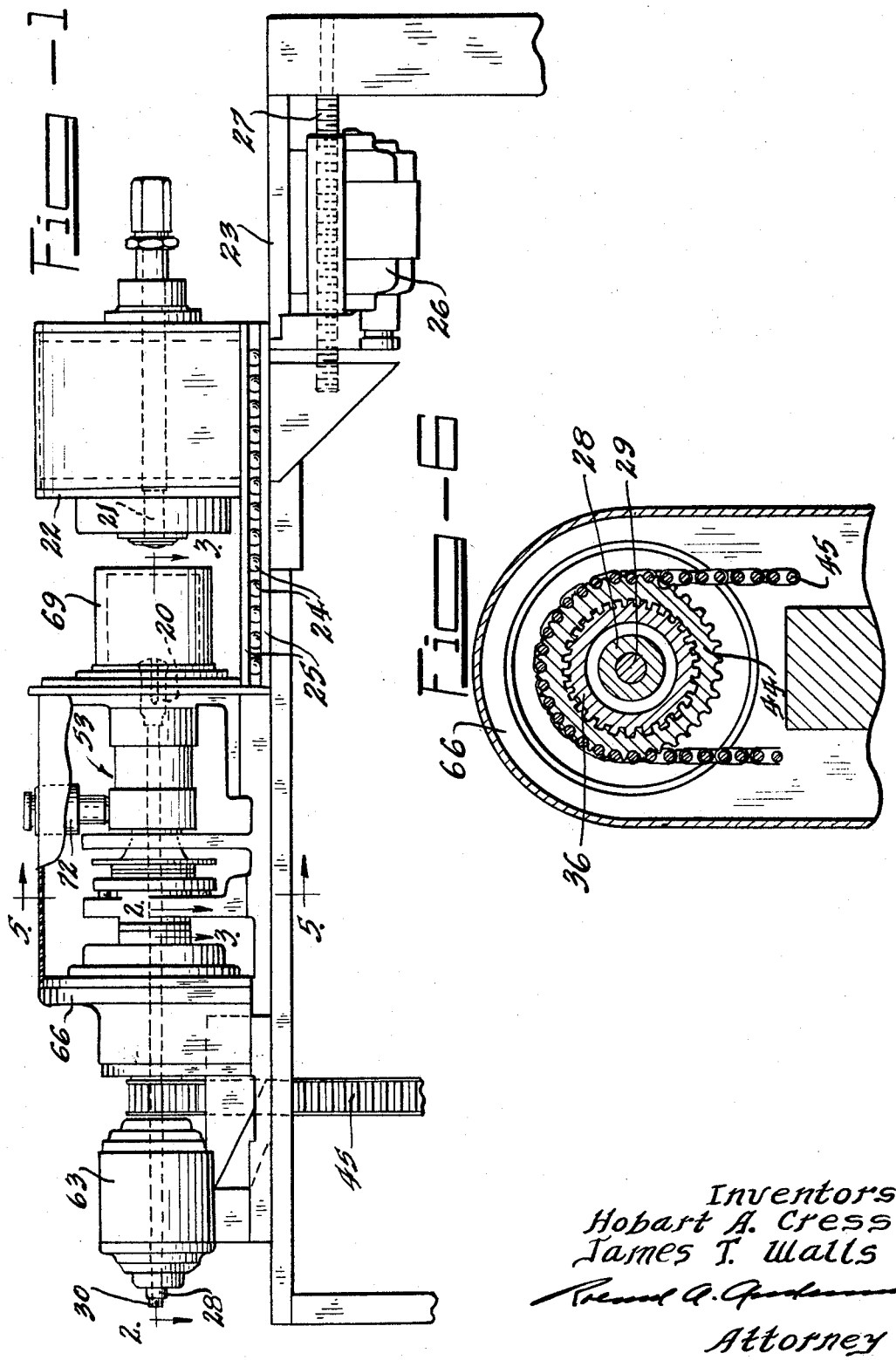
Inventors
Hobart A. Cress
James T. Walls
Attorney

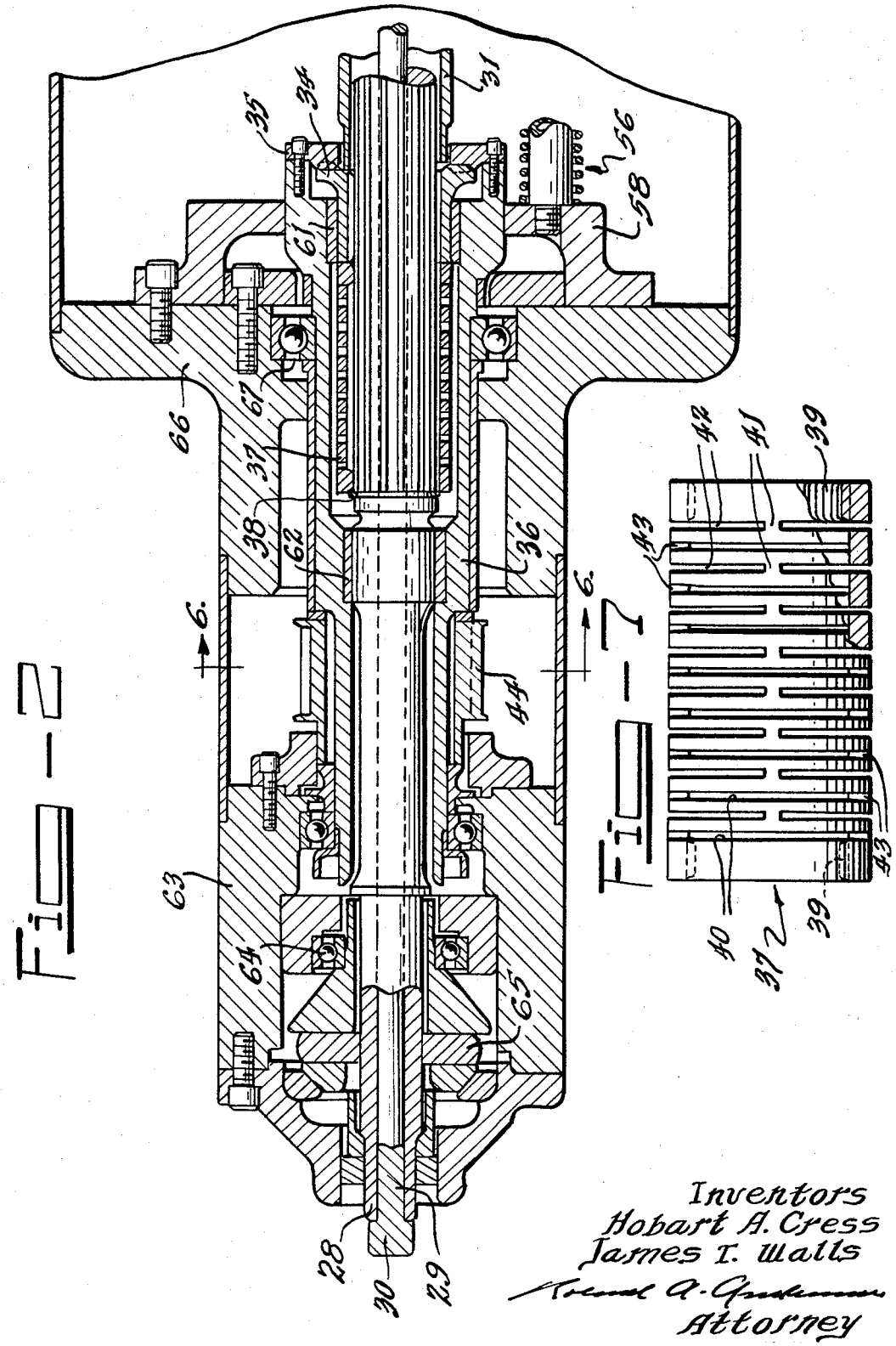

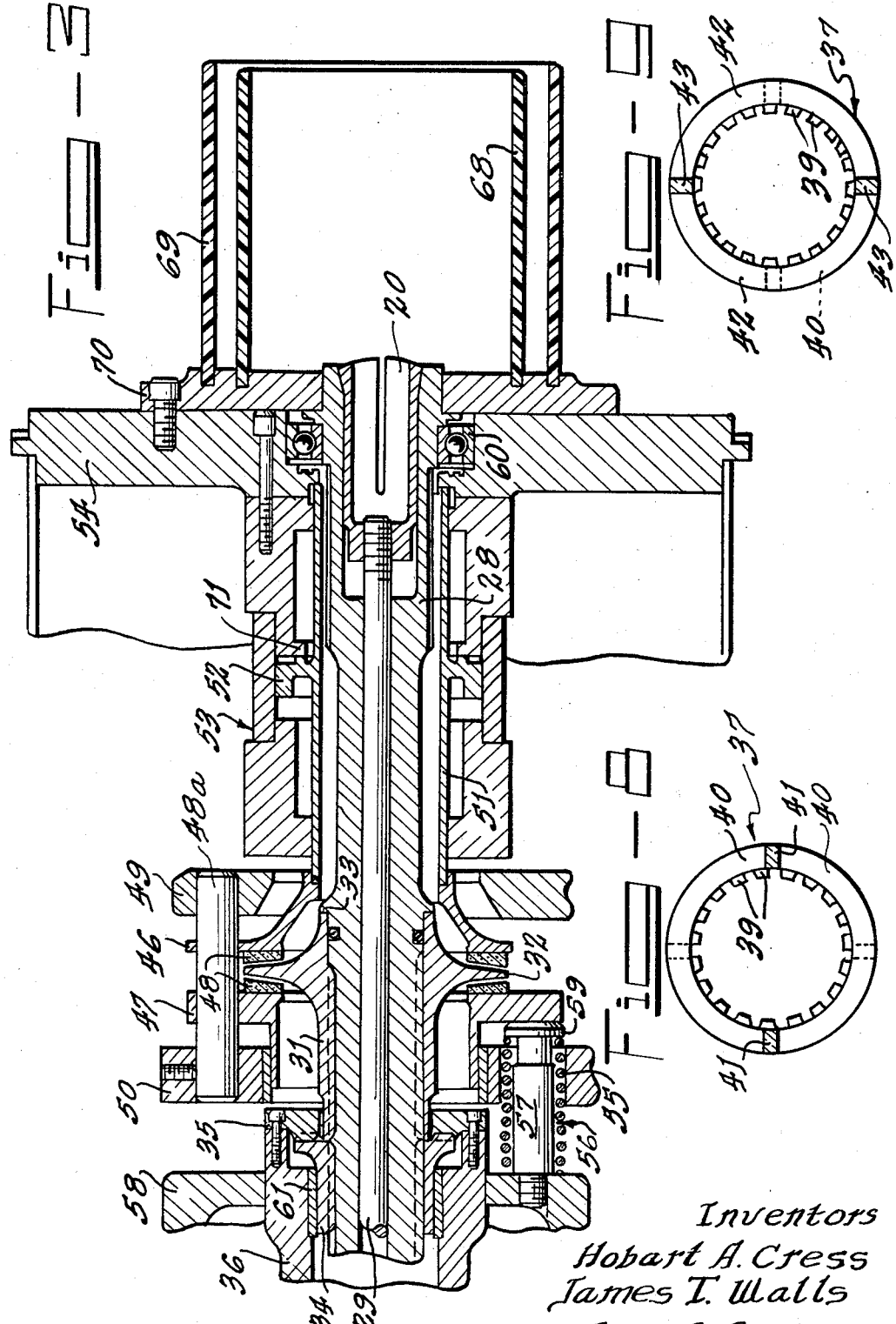

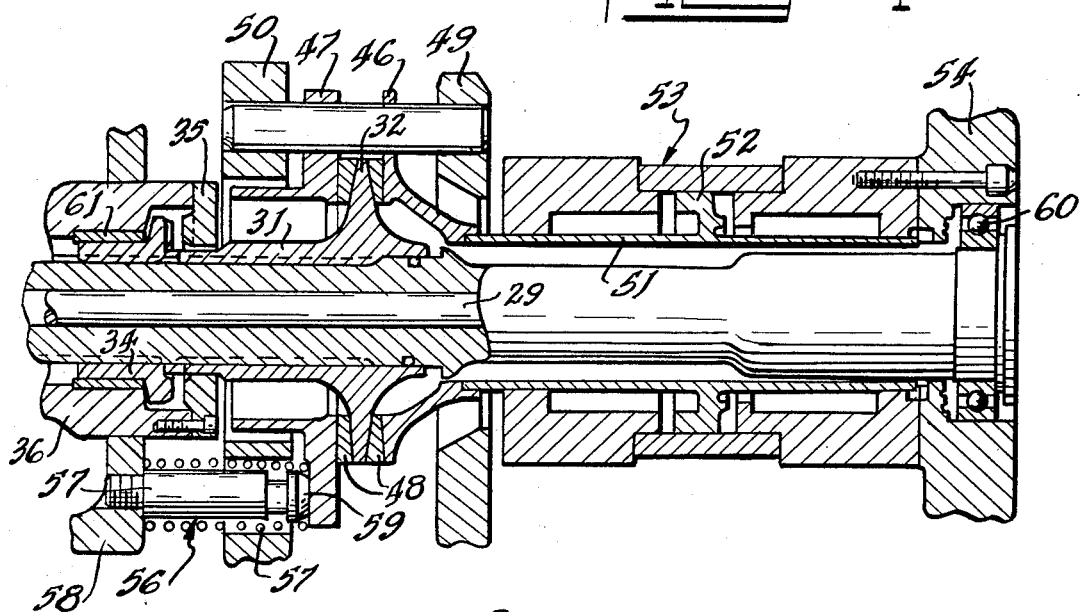
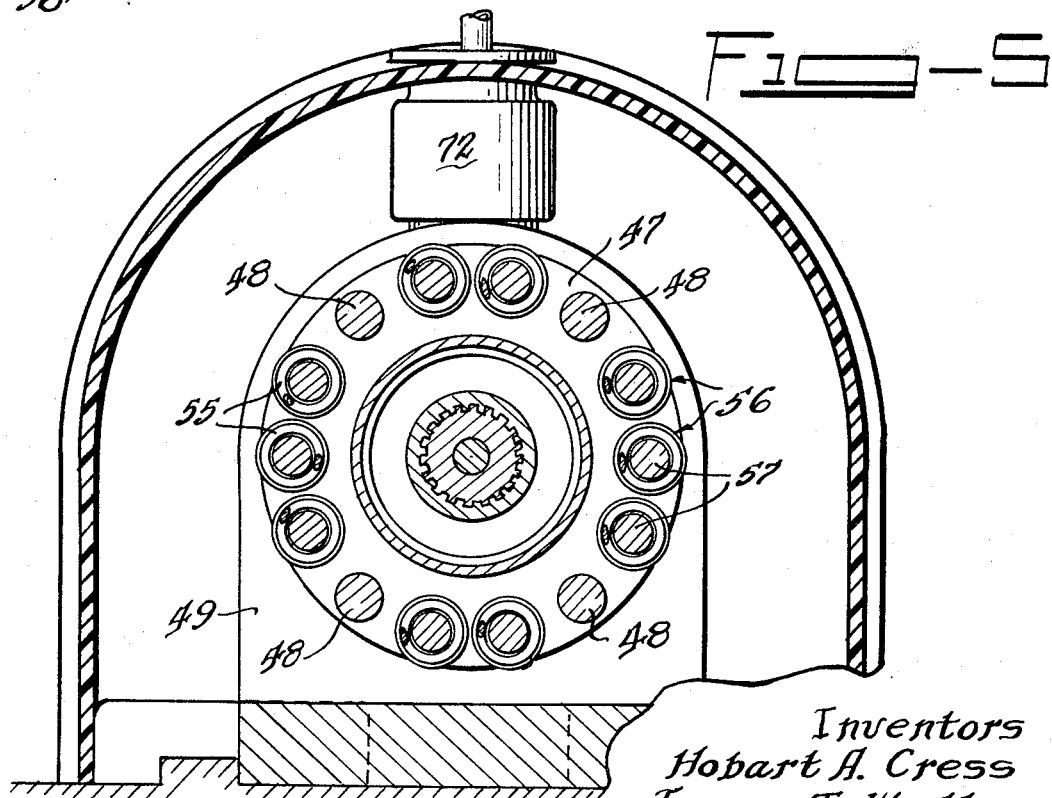

United States Patent Office 3,396,893
Patented Aug. 13, 1968

3,396,893
FRICTION WELDER
Hobart A. Cress and James T. Walls, Columbus, Ohio, assignors to the United States of America as represented by the United Atomic Energy Commission
Filed Nov. 1, 1966, Ser. No. 591,349
5 Claims. (Cl. 228—2)

The invention described herein was made in the course of, or under, a contract with the U.S. Atomic Energy Commission.

This invention relates to friction welding. More specifically, the invention relates to an apparatus in which one of two parts to be welded is held stationary and the other part is rotated in contact with the one part and stopped quickly when welding heat is reached.

A grave drawback in the friction welding of certain metals such as beryllium is that the required pressure between parts rotated relatively to one another for friction welding can well cause upsetting or other breakup of the parts if the relative speed of rotation is low. Thus, the desirability of low pressure and high rotational speed is indicated, but now the problem becomes one of stopping the high-speed rotation quickly enough for welding to occur before the heat needed for welding is dissipated.

According to the present invention, when welding heat is reached, driving of a rotating shaft carrying the rotating part to be welded is interrupted by disengagement of a clutch, and a brake is applied suddenly and with great force to stop the shaft and the rotating part.

In the drawings:

FIG. 1 is an elevational view of the friction welder of the present invention, with parts broken away;

FIG. 2 is a longitudinal sectional view taken on the line 2—2 of FIG. 1, showing a portion of the welder;

FIG. 3 is a longitudinal sectional view taken on the line 3—3 of FIG. 1, showing another portion of the welder;

FIG. 4 is a longitudinal sectional view essentially the same portion of the welder as FIG. 3, but with the parts in a different position;

FIG. 5 is a transverse sectional view taken on the line 5—5 of FIG. 1, showing a brake and its applications to a rotating shaft of the friction welder;

FIG. 6 is a transverse sectional view taken on the line 6—6, showing the drive mechanism for a sleeve used to drive the rotating shaft;

FIG. 7 is an elevational view, with parts broken away in section, of a spring used to keep a clutch of the welder engaged and the brake disengaged;

FIG. 8 is a transverse sectional view taken on the line 8—8 of FIG. 7; and

FIG. 9 is a transverse sectional view taken on the line 9—9 of FIG. 7.

As shown in FIG. 1, the friction welder of the present invention comprises a rotatable collet 20 and a fixed or nonrotatable collet 21, which are in opposed relation to one another. The fixed collet 21 is carried in a support 22, which is slidably mounted on a table 23 by means including balls 24 and ways 25 in which the balls operate. The longitudinal position of the fixed collet 21 with respect to the rotatable collet 20 is controlled by a motor 26 driving a lead screw 27 engaging a nonrotatable nut (not shown) connected to the support 22.

As shown in FIGS. 2 and 3, the rotatable collet 20 is mounted in one end of a rotatable shaft 28. A drawbar 29, which adjusts the collet 20, extends longitudinally through the shaft 28 and has one end in threaded connection wtih the base of the collet 20 and the other end formed as a head 30 engaging the end of the shaft 28 remote from the collet 20.

As shown in FIG. 3, a brake member 31 having an external disk portion 32 is located near but spaced from the rotatable collet 20, is splined to the shaft 28, and has its end toward the collet 20 in abutment with a shoulder 33 formed on the shaft 28. The opposite end of the brake member 31 is engaged by one end of a dog-clutch member 34, which is splined to the shaft 28. The end of the dog-clutch member 34 engaging the end of the brake member 31 has clutch teeth in engagement with clutch teeth on a ring 35. The ring is fixed to an end of a sleeve 36 so as to form a portion of the sleeve 36, the said end of the sleeve 36 being closer to the collet 20 than is the other end of the sleeve.

As shown in FIG. 2, the end of the dog-clutch member 34 away from the brake member 31 is engaged by one end of a spring 37, the other end of which engages a retaining ring 38 lodged in a groove in the shaft 28. The spring 37 has internally splined end portions 39 splined to the shaft 28. As shown in FIGS. 7, 8, and 9, the spring 37 is formed of a cylinder that, except at end portions 39, is slotted to achieve spring characteristics. As shown in FIGS. 7 and 8, the cylinder of the spring 37 has two sets of slots 40 formed from opposite sides of the cylinder to leave two groups of unslotted portions 41 which extend along the cylinder, one group of unslotted portions 41 being spaced 180° about the cylinder from the other group. As shown in FIGS. 7 and 9, the cylinder of the spring 37 has two sets of slots 42 formed from opposite sides of the cylinder to leave two groups of unslotted portions 43 which extend along the cylinder, one group of unslotted portions 43 being spaced 180° about the cylinder from the other group. Both groups of unslotted portions 43 are spaced 90° about the cylinder from the two groups of unslotted portions 41 and alternate with respect thereto along the cylinder. The slots 40 alternate along the cylinder with respect to the slots 42.

The spring 37, being constructed as just described, has a high spring rate and is formed of an annealed high-carbon spring steel. The purpose of the spring 37 is to hold the dog-clutch member 34 in engagement with the portion 35 of the sleeve 36 and the brake member 31 disengaged, as shown in FIG. 3.

As shown in FIG. 2, the shaft 28 is driven through the dog-clutch member 34 and the dog-clutch portion 35 by the sleeve 36. The sleeve in turn is, as shown in FIG. 6, driven by a sprocket gear 44 and a sprocket chain 45. The gear 44 is splined to the sleeve 36, and the chain 45 meshes with the gear 44.

As shown in FIGS. 3 and 4, a front brake shoe 46 and a rear brake shoe 47 lie on opposite sides of the disk portion 32 of the brake member 31 and carry asbestos linings 48 engageable with the disk portion. The brake shoes 46 and 47 are slidably mounted on, and held against rotation by, pins 48a, which, as shown in FIG. 5, are four in number and are fixed to framework portions 49 and 50. As shown in FIGS. 3 and 4, the front brake shoe 46 is attached to one end of a hollow power member 51 having an annular piston portion 52. A cylinder 53, formed of a plurality of parts secured to one another, contains and slidably mounts the hollow power member 51 and its piston portion 52. The end of the hollow power member 51 remote from the front brake shoe 46 is adjacent the rotatable collet 20. The cylinder 53 is attached to a framework portion 54.

The rear brake shoe 47 is urged to the right as viewed in FIGS. 3 and 4 by springs 55, which are eight in number, as shown in FIG. 5. The springs 55 surround dashpots 56, each of which comprises a cylinder 57 attached to a framework portion 58 and a piston 59 slidable in the cylinder 57 and engaging the rear brake shoe 47. The springs 55 engage the heads of the pistons 59 to urge them against the rear brake shoe 47. Yet the springs 55 must not push the rear brake shoe 47 against the disk portion 32 of the brake member 31 when the latter is in the disengaged position of FIG. 3. This is accomplished by choosing the spring length such that the springs 55 become free and incompressed before the rear brake shoe 47 can reach a position of contact with the disk portion 32 in its position of FIG. 3.

As shown in FIG. 3, the end of the shaft 28 to which the rotatable collet 20 is attached is rotatably supported by a ball bearing 60 in the frame portions 54. As shown in FIG. 2, an intermediate portion of the shaft 28 is rotatably supported in the sleeve 36 by a journal bearing 61, which exteriorly engages the dog-clutch member 34. Beyond the left end of the spring 37 as viewed in FIG. 2, the shaft 28 is rotatably supported in the sleeve 36 by a journal bearing 62. Beyond the left end of the sleeve 36 as viewed in FIG. 2, the shaft 28 is rotatably supported in a framework portion 63 by a ball bearing 64. The left end on the end of the shaft 28 remote from the end to which the rotatable collet is attached is rotatably supported in the framework portion 63 by a hydrodynamic thrust bearing 65, which includes small pivoted shoes (not shown) and in which the rotation of parts produces oil wedges providing the actual support of the end of the shaft 28. The bearing 61 provides the requisite end support of the shaft 28 at the high speeds at which it must operate to aid in the carrying out of the friction welding. The journal bearings 61 and 62, rather than ball bearings, are used, because it is desirable to hold down the radius of the sleeve 36, and because the sleeve 36 and the shaft 28 rotate relative to one another only during the brief period in which the shaft 28 is drivingly disconnected from the sleeve 36 and is being braked.

As shown in FIG. 2, the end of the sleeve 36 to the right as viewed in this figure or toward the end of the shaft 28 to which the collet 20 is attached, is supported in a framework portion 66 by a ball bearing 67 which is located outside and around the spring 37.

When the friction welder of the present invention is to be operated, the parts to be welded (not shown), which may be formed of beryllium, are inserted in the collets 20 and tightly gripped thereby, and the support 22 and fixed collet 21 are moved leftward of the position of FIG. 1 until the parts to be welded are brought into contact. In the meantime, two cylinders 68 and 69 of transparent acrylic resin, which are carried by, and sealed, to a plate 70 fastened to the framework portion 54, have been sealingly engaged by the support 22, and a suitable welding atmosphere is provided in the cylinders 68 and 69. When the sleeve 36 begins to drive the shaft 28, the parts are positioned as shown in FIG. 3, the clutch member 34 being engaged with the clutch portion 35, the brake disk portion 32 being disengaged by the brake shoes 46 and 47, and the piston portion 52 of the power member being in engagement with an internal flange 71 of the cylinder 53.

The power member 51 is positioned as shown in FIG. 3, because the total force urging the piston portion 52 against the internal flange 71 is greater than the total force urging the piston portion 52 away from the flange 71. This may be accomplished by having high-pressure gas act against the relatively small area of the piston portion 52 not covered by the flange 71 and low-pressure gas act against the relatively large area of the side of the piston portion 52 away from the flange 71.

When the parts to be welded have been relatively rotated in contact with one another enough to reach welding heat, the power member 31 is moved to the left as viewed in FIG. 3. This movement may be accomplished by release from the cylinder 53, of the low-pressure gas acting against the side of the piston portion 52 away from the flange 71. Now the high-pressure gas in the cylinder 53 at the other side of the piston portion 52 moves the same out of contact with the internal flange 71 of the cylinder 53, and as a result, a greatly increased area of the piston portion 52 is uncovered and subjected to the high-pressure gas. Thus, the power member 51 is moved suddenly and with great force to the position of FIG. 4. The valve 72, which releases the low-pressure gas at the left of the piston portion 52, is fast-acting and may be of the type disclosed and claimed in Ahlbeck and Cress Patent 3,347,135, dated Oct. 17, 1967.

As shown in FIG. 4, the power member 51, moving to the left, pushes the front brake shoe 46 to the left against the disk portion 32 of the brake member 31, moving it to the left against the rear brake shoe 47. The engagement of the disk portion 32 by the brake shoes 46 and 47 quickly stops rotation of the shaft 28, the collet 20, and the part to be welded lodged therein, so that the latter part becomes welded to the part held by the fixed collet 21. At the same time the front brake shoe 46 moving to the left engages the disk portion 32 of the brake member 31, moving it to the left, the brake member, by virtue of its engagement with the end of the dog-clutch member 34, moves the latter to the left and out of engagement with the dog-clutch portion of the sleeve 36. Thus the drive of the shaft 28 is interrupted by declutching immediately upon initiation of the braking action. Once the drive of the shaft 28 is interrupted, braking of the shaft can occur very fast, because the rotational inertia of the shank 28 and the associated parts is relatively low, since its radius is small, and the only associated parts having an appreciably greater radius, namely, the toothed portion of the dog-clutch member 34 and the disk portion 32 of the brake member 31, have a very low mass.

When the welding is completed, the sleeve 36 is stopped, and the welded parts are removed from the collets 20 and 21. The power member 51 is returned to the position of FIG. 3 by release of high-pressure gas from the chamber in the cylinder 53 to the right of the piston portion 52 and by closing of the valve 72, which reestablishes the low-pressure gas in the chamber of the cylinder 53 to the left of the piston portion 52. The rightward movement of the power member 51 to the position of FIG. 3 causes the front brake shoe to move to the right out of engagement with the disk portion 32 of the brake member 31. The spring 37 moves the dog-clutch member 34 to the right into engagement with the dog-clutch portion 35 of the sleeve 36, and the dog-clutch member 34 in turn moves the brake member 31 to the right and the disk portion 32 thereof out of engagement with the rear brake shoe 47.

With the apparatus of the present invention, it has been possible to reduce the rotational speed of the shaft 28 from 10,000 r.p.m. to zero within one revolution of the shaft.

It is understood that the invention is not to be limited by the details given herein but that it may be modified within the scope of the appended claims.

The embodiments of the invention in which an exclusive property or privilege is claimed are defined as follows:

1. A friction welder comprising
 (A) a rotatable collet for holding one of two parts to be welded, the other part being adapted to be held in a stationary collet,
 (B) a rotatable shaft having one end fixed to the rotatable collet,
 (C) a brake member surrounding and splined to the shaft and having an external disk portion, the shaft having a shoulder in the neighborhood of the said one end of the shaft engaged by the end of the brake member facing the said one end of the shaft,
 (D) a dog-clutch member surrounding and slidably keyed to the shaft and having one end engaging the end of the brake member remote from the said one end thereof,
 (E) a spring acting between the shaft and the end of the dog-clutch member remote from the said one end thereof to urge the dog-clutch member against the brake member and the brake member against the shoulder on the shaft, (F) a sleeve surrounding the shaft, the spring, and the dog-clutch member, and having at one end an internal dog-clutch portion drivingly engaging the dog-clutch member for transmitting rotation of the sleeve to the shaft, the dog-clutch portion engaging the dog-clutch member when the latter engages the brake member and the brake member engages the shoulder on the shaft, and (G) means acting against the disk portion of the brake member so as to hold the same against rotation for stopping rotation of the shaft and to move the same away from the said one end of the shaft and thereby to disengage the dog-clutch member from the dog-clutch portion of the sleeve for preventing rotation of the sleeve from being transmitted to the shaft.

2. The friction welder specified in claim 1 and further comprising (A) a hollow power member surrounding the shaft and having one end adjacent the said one end of the shaft and the other end engaging the said means specified in claim 1 to make the said means act against the disk portion of the brake member, the power member having an external annular piston portion, and (B) a cylinder containing and slidably mounting the power member and its piston portion.

3. The friction welder specified in claim 2 and further comprising (A) a casing, (B) a first ball bearing mounting a portion of the sleeve radially outward of the spring in the casing, (C) a second ball bearing mounting the end of the sleeve remote from the dog-clutch portion in the casing, the shaft having a portion extending beyond the end of the sleeve mounted by the second ball bearing and terminating in an end remote from the said one end attached to the rotatable collet, (D) a third ball bearing mounting the last mentioned portion of the shaft in the casing, and (E) a hydrodynamic thrust bearing located closer to the end of the shaft remote from the said one end thereof than the third ball bearing and mounting the said portion of the shaft in the casing.

4. The friction welder specified in claim 3 and further comprising (A) a first journal bearing mounting the dog-clutch member in the sleeve, (B) a second journal bearing mounting the shaft in the sleeve and being located beyond the end of the spring remote from the end thereof engaging the dog-clutch member, and (C) a fourth ball bearing mounting the said one end of the shaft in the casing.

5. The friction welder specified in claim 1, the spring being a cylinder having internally splined end portions splined to the shaft, the remainder of the cylinder having first and second sets of slots formed from opposite sides of the cylinder to leave a first group of unslotted portions of the cylinder extending therealong and a second group of unslotted portions of the cylinder extending therealong and located 180° around the cylinder from the first group, the cylinder also having third and fourth sets of slots formed from opposite sides of the cylinder to leave a third group of unslotted portions of the cylinder extending therealong and a fourth group of unslotted portions of the cylinder extending therealong and located 180° around the cylinder from the third group, the third and fourth groups being located 90° around the cylinder from the first and second groups, the first and second sets of slots alternating with the third and fourth sets of slots along the cylinder.

References Cited

UNITED STATES PATENTS 3,235,161    2/1966    Cooper _____ 228—2

RICHARD H. EANES, Jr., *Primary Examiner.*